US008857225B2

(12) United States Patent
Barzizza et al.

(10) Patent No.: US 8,857,225 B2
(45) Date of Patent: Oct. 14, 2014

(54) WASHING MACHINE WITH A DIRECT DRIVE MOTOR SYSTEM (75) Inventors: Ferruccio Barzizza, Vergiate (IT);
Antonio Chiriatti, Schorndorf (DE);
Pavol Petracek, Schorndorf (DE);
Valentina Cadario, Travedona Monate (IT)

(73) Assignee: Whirlpool Corporation, Benton Harbor, MI (US)

( * ) Notice: Subject to any disclaimer, the term of this patent is extended or adjusted under 35 U.S.C. 154(b) by 1126 days.

(21) Appl. No.: 12/816,408

(22) Filed: Jun. 16, 2010

(65) Prior Publication Data
US 2010/0251783 A1 Oct. 7, 2010

(51) Int. Cl.
*D06F 21/00* (2006.01)
*D06F 23/00* (2006.01)
*D06F 25/00* (2006.01)
*H02K 21/22* (2006.01)
*H02K 1/14* (2006.01)
*H02K 1/18* (2006.01)
*D06F 37/30* (2006.01)
*H02K 1/27* (2006.01)
*H02K 21/14* (2006.01)
*H02K 3/52* (2006.01)

(52) U.S. Cl.
CPC .............. *H02K 1/187* (2013.01); *H02K 21/225* (2013.01); *H02K 1/148* (2013.01); *H02K 1/185* (2013.01); *D06F 37/304* (2013.01); *H02K 1/2786* (2013.01); *H02K 21/14* (2013.01); *H02K 1/278* (2013.01); *H02K 3/522* (2013.01)
USPC ............................................. 68/140

(58) Field of Classification Search
CPC ..................................................... D06F 39/12
See application file for complete search history.

(56) References Cited

U.S. PATENT DOCUMENTS

| 6,992,419 | B2 | 1/2006 | Kim et al. | |
| 7,380,424 | B2 * | 6/2008 | Kim et al. | 68/140 |
| 2008/0054740 | A1 | 3/2008 | Kim et al. | |

FOREIGN PATENT DOCUMENTS

WO 2006/075903 A2 7/2006

OTHER PUBLICATIONS

European Patent Application No. 09155040.0, filing date: Mar. 12, 2009. Applicant: Whirlpool Corporation. European Publication No. EP2228481A1,published Sep. 15, 2010.

* cited by examiner

*Primary Examiner* — Jason Ko (57) ABSTRACT

A washing machine with a direct drive motor system including a tub, a drum rotatably mounted inside the tub, a shaft connected to the drum, and a direct drive motor comprising a rotor assembly fastened to the shaft and including magnets positioned in a circumferential direction, and a stator assembly. The stator assembly includes a plurality of magnetic cores and a disc-shaped element including a plurality of finger-shaped portions. Each of the finger-shaped portions has one of the plurality of magnetic cores secured thereto.

6 Claims, 8 Drawing Sheets

WASHING MACHINE WITH A DIRECT DRIVE MOTOR SYSTEM

CROSS-REFERENCE TO RELATED APPLICATIONS

Cross-reference is made to European Patent Application No. 09155040.0 entitled "Washing machine with a direct drive system," which was filed on Mar. 12, 2009 and is expressly incorporated herein by reference.

TECHNICAL FIELD

The present disclosure relates generally to a washing machine and more particularly to a drive system for a washing machine.

BACKGROUND

The majority of the direct drive motor systems for washing machines, either front loading or top loading washing machines have the stator core formed from a continuous helically wound metallic strip having a plurality of teeth defined between formed in one edge thereof.

In those washing machines, the weight of the overall motor system is increased by the material needed for assuring a mechanical continuity between the teeth. Additionally, this kind of construction cannot be used for the dual rotor type motor, in which the rotor assembly presents an outer crown-shaped portion with a first series of magnets secured along a circumferential direction and an inner crown-shaped portion with a second series of magnets.

A direct drive motor system for a washing machine having dual rotor type motor is disclosed by WO 2006/075903. In this document the stator presents a plurality of single partition cores formed in a double T shape, each formed by stacked laminations and provisionally connected, during the assembly process of the stator, by means of two circular insulators connected each other in order to obtain one single element. A similar direct drive motor system is disclosed by U.S. Pat. No. 6,992,419 in which the stator is fabricated with a number of individual cores which are then integrally formed into a single body in annular form via an insert molding using thermosetting resin. Even if these known solutions solve the problem of providing a stator for a dual rotor type motor, nevertheless the process of assembling the stator is quite complex, since after having mounted the single cores between the two insulators and after having wound the coils around the insulators, this not yet finished component is put in a metal mold and resin is injected for producing a quite complex molding part having also a portion for fixing the stator to the tub or to the motor securing tub. The complex assembly process and the use of a polymer increases the overall cost of the direct drive motor system, particularly because the polymer must have certain mechanical characteristic in order to guarantee a dimensional stability of the stator. This means that low cost thermoplastics polymers like polypropylene cannot be used. Usually the higher the mechanical features of the polymer, the higher the temperature of the injection molding process. This can lead to problems of a higher melting point of the resin compared to that of the enamel of the coil as well as that of the insulator material, with possible damages of both.

SUMMARY

According to one aspect of the disclosure, a washing machine with a direct drive motor system is disclosed. The washing machine includes a tub, a drum rotatably mounted inside the tub, a shaft connected to the drum, and a direct drive motor including a rotor assembly fastened to the shaft and including magnets positioned in a circumferential direction, and a stator assembly. The stator assembly a plurality of magnetic cores of stacked laminations, a plurality of insulators, and a disc-shaped element including a plurality of finger-shaped portions. At least one of the plurality of insulators surrounds each of the plurality of magnetic cores, and a number of coils are wound on an outer surface of each of the plurality of insulators. At least one of the finger-shaped portions has one of the plurality of magnetic cores secured thereto.

In some embodiments, each of the finger-shaped portions may project in a radial direction. In some embodiments, each of the finger-shaped portions may be integral with the disc-shaped element. Additionally, in some embodiments, the disc-shaped element may be secured to a wall of the tub and defines therewith a hollow space where the rotor assembly is placed, and each of the finger-shaped portions may include an L-shaped tongue integral with the disc-shaped element.

In some embodiments, the wall of the tub may be provided with a metal insert that matches the disc-shaped element. In some embodiments, the metal insert may support an outer ring of a bearing of the shaft. In some embodiments, at least one L-shaped tongue may include a flat portion having a contour corresponding to a shape of one of the stacked laminations of the magnetic cores. Additionally, in some embodiments, the disc-shaped element may support a bearing of the shaft.

In some embodiments, the disc-shaped element may be fastened on an inner side of a cover secured to a wall of the tub, the disc-shaped element may define a hollow space for the rotor assembly, and each of the finger-shaped portions of the disc-shaped element may project outward. In some embodiments, the wall of the tub may include a stiffening metal insert that matches the cover. In some embodiments, the disc-shaped element of the stator assembly may be secured to a wall of the tub, and the disc-shaped element may be interposed between the tub and the rotor assembly.

In some embodiments, the wall of the tub may include a stiffening metal insert that matches the disc-shaped element. Additionally, in some embodiments, each of the finger-shaped portions of the disc-shaped element may project outward. In some embodiments, the disc-shaped element of the stator assembly may be fastened to a cover element secured to a wall of the tub. The disc-shaped element may be interposed between the cover element and the rotor assembly.

In some embodiments, the wall of the tub may include a stiffening metal insert that matches the cover element. In some embodiments, the rotor assembly may include a cup-shaped element having an annular external crown portion and an annular internal crown portion.

According to another aspect, a method for producing a direct drive motor system for a washing machine includes forming a disc-shaped element including at least one L-shaped tongue, fastening a magnetic core to the L-shaped tongue, mounting at least one insulator on a front face of the magnetic core, and winding a coil around the magnetic core and the L-shaped tongue. In some embodiments, forming the disc-shaped element including the at least one L-shaped tongue may include punching a metal disc to form the L-shaped tongue, and shaping the L-shaped tongue to have a first portion secured to a second portion projecting in a radial direction. In some embodiments, fastening the magnetic core to the L-shaped tongue may include one of tacking, tack-welding, spot-welding, and molding the magnetic core to the L-shaped tongue.

Additionally, in some embodiments, the method may further include obtaining a rotor assembly, which includes cutting a plurality of wall portions of a metal flat cup-shaped element, and bending each of the plurality of wall portions to obtain a plurality of bent flaps that define an inner crown of a dual rotor.

BRIEF DESCRIPTION OF THE DRAWINGS

The detailed description particularly refers to the following figures, in which.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
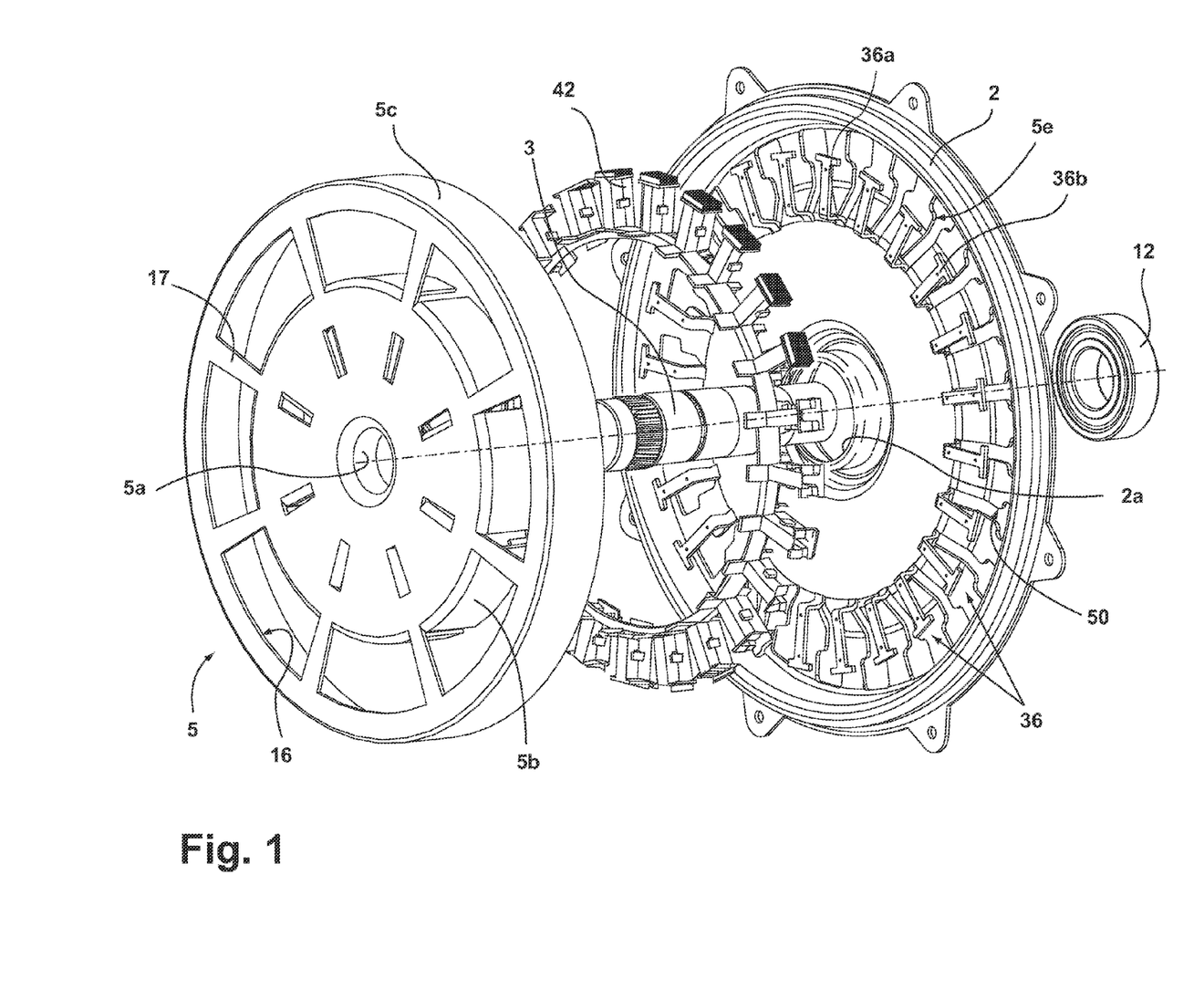
FIG. 1 is an exploded prospective view of a direct drive motor system.
Figure 2:
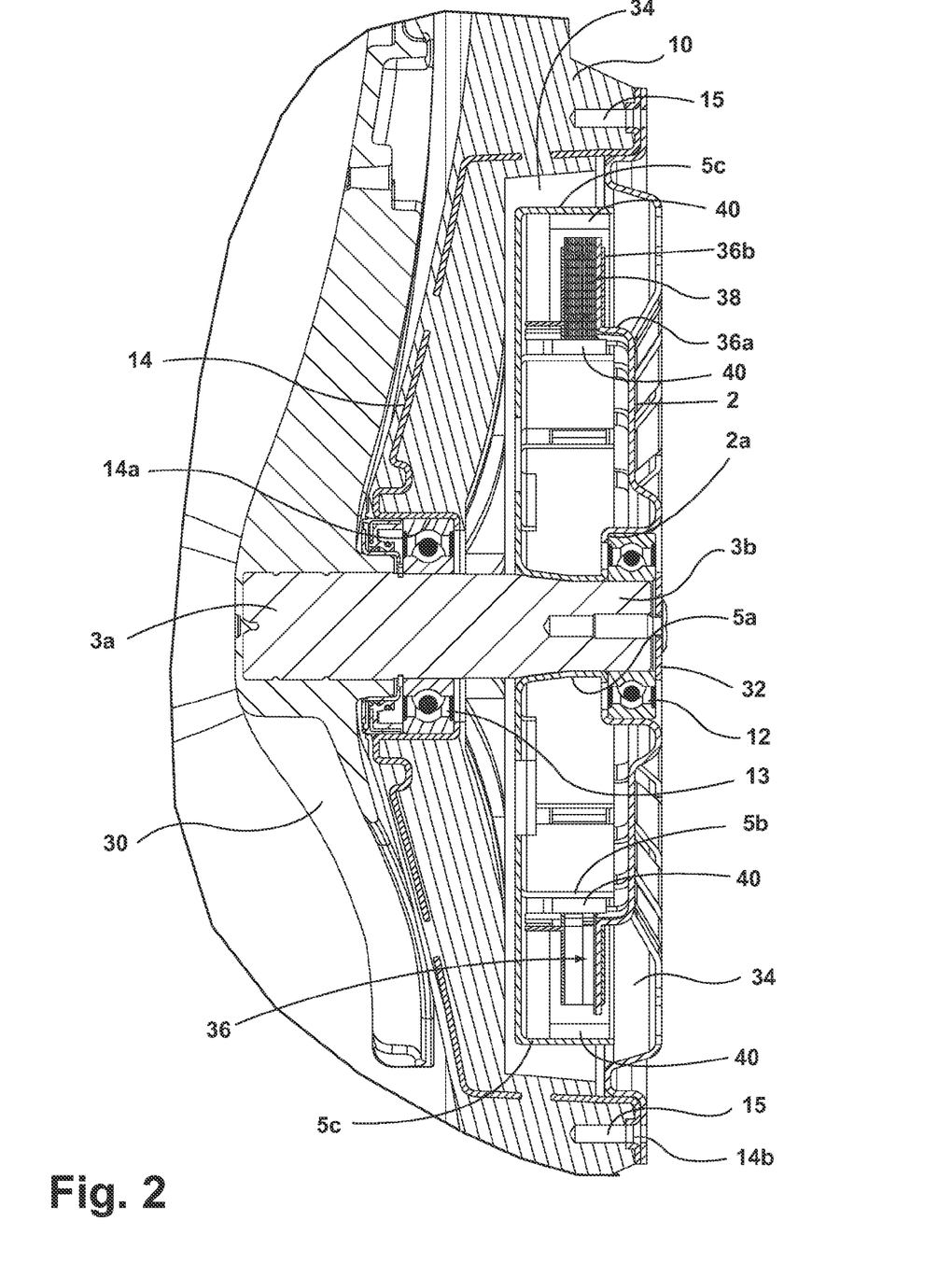
FIG. 2 is a cross longitudinal section of the motor system of FIG. 1 installed on a washing machine.

With reference to FIGS. 1 and 2, a plastic tub 10 of a washing machine (FIG. 2) presents an insert molded circular metal stiffener 14 having a central portion 14a acting as a support for the outer ring of a first ball bearing 13. The circular metal stiffener 14 is shaped so that its peripheral portion emerges frontally from the tub 10 and matches a disc-shaped metal cover 2 fixed on the rear wall of the tub 10. The stiffener 14 includes a plurality of stiffening ribs (not shown). The disc-shaped metal cover 2 is fixed by means of bolts 15 or similar fastening means. The bolts 15 are cooperating with corresponding holes 14b of the metal stiffener 14 in order to guarantee a very precise centering of the metal cover 2 with reference to the tub 10. A shaped central aperture 2a of the cover 2 acts as the housing of a second bearing 12. In the bearings 13 and 12 is rotatably mounted a shaft 3 fastened, on a first end 3a, to a drum 30 of the washing machine (FIG. 2) and on a second end 3b, to an insert 32, which abuts the inner ring of the second bearing 12. Between the tub 10 and the cover 2, a circular chamber 34 is defined in which a rotor assembly 5 is mounted.

The rotor assembly 5 is of the dual rotor type and includes a central tubular portion 5a keyed on the shaft 3, an inner crown 5b and an outer crown 5b, each crown being provided with magnets 40 secured along a circumferential direction.

The inner crown 5b of the rotor assembly 5 is obtained by providing C-shaped cutting 16 on the flat central portion of a cup-shaped element and then by bending the so obtained tongues. By this process a dual rotor is produced in a quick way by simple metal bending, the outer crown 5c being connected to the rest of the rotor by spokes 17 between the cutting 16.

In this embodiment, the metal cover 2 includes an annular zone where a plurality of L-shaped tongues 36 or flaps are punched along a C-shaped profile and then shaped so that each tongue has a first portion 36a substantially parallel to the shaft 3 and a second portion 36b which is projecting outward in a radial direction. The second portions 36b of each tongue 36 has a shape corresponding to the shape of single partition core 38 made of stacked lamination.

In the assembly process of the direct drive motor system of FIGS. 1 and 2, the single cores 38 are frontally assembled to the second portions 36b of the flap 36 by known techniques, including tacking, tack-welding, or spot-welding. Then two crown shaped plastic insulators 42 are mounted on the two front faces of the cores 38 fixed to the tongues 36, and then a coil is wound around each core 38 and tongue 36.

The cover 2 has also the function of a back stiffening support and is aligned through the bearing holder to the shaft 3; this ensures the proper alignment between stator and rotor. The plurality of holes 50 obtained through the punching process of the tongues 36 allows a good air flow in the motor and therefore a good cooling thereof.

Figure 3:
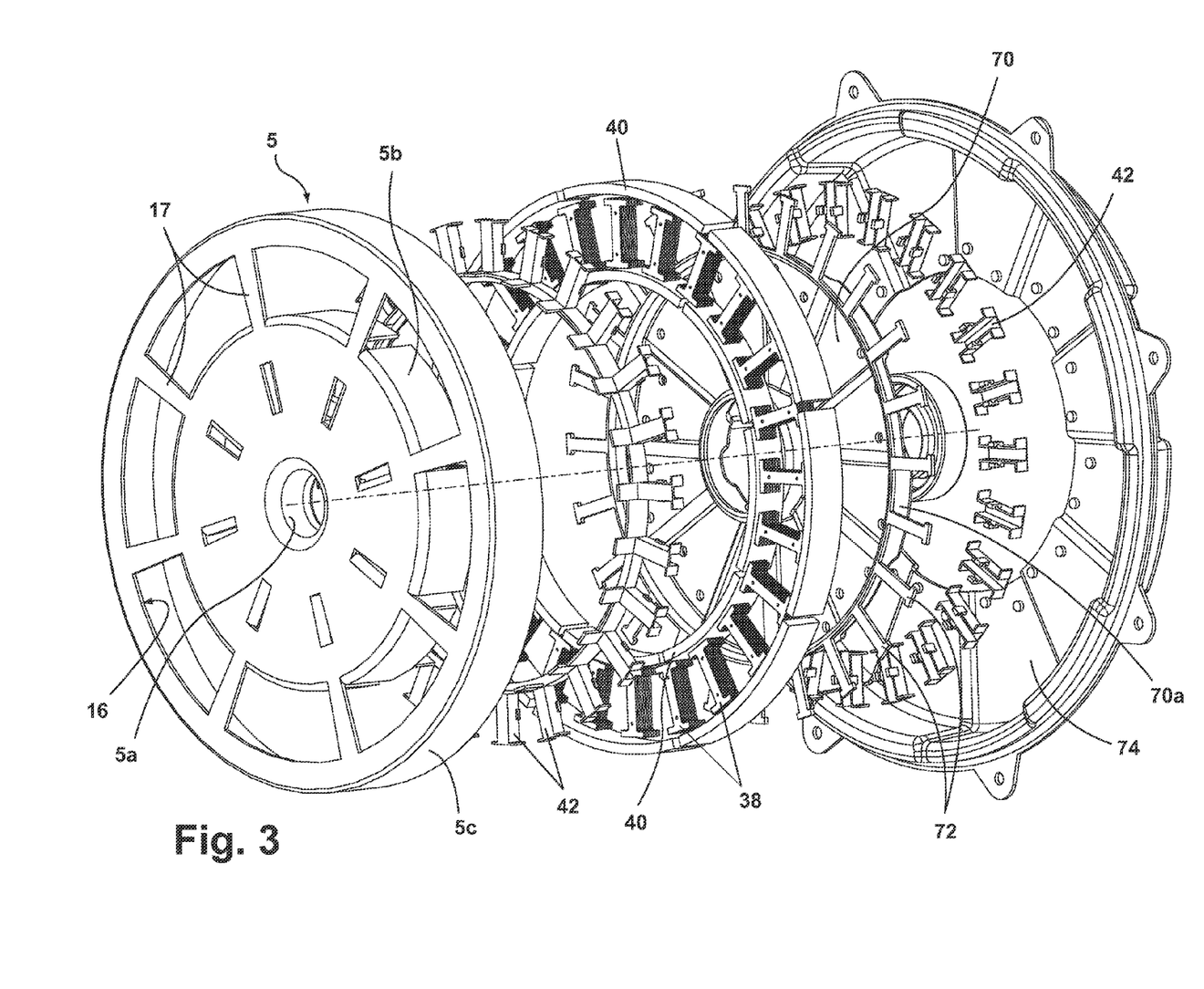
FIG. 3 is an exploded view similar to FIG. 1 and shows a second embodiment.
Figure 4:
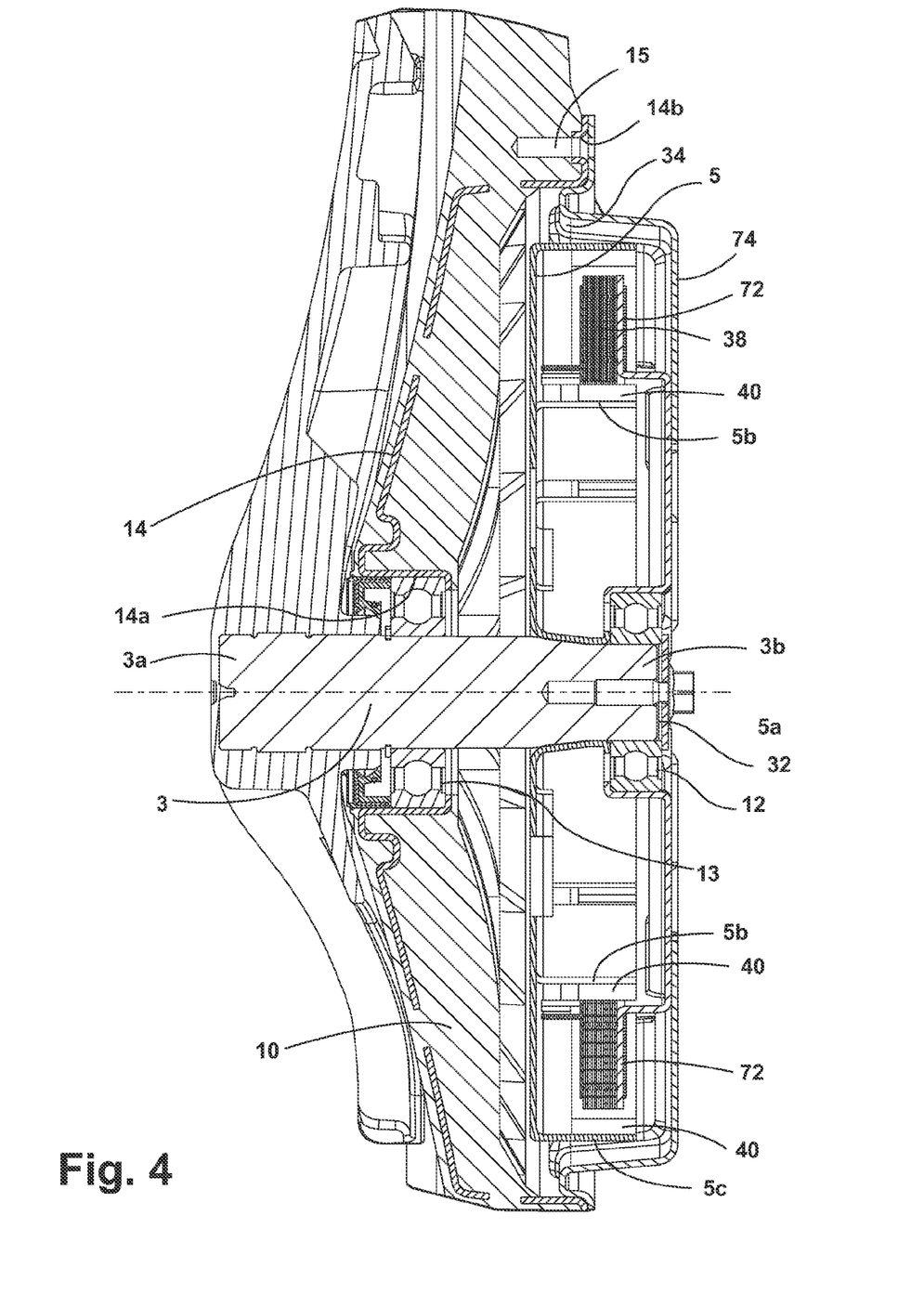
FIG. 4 is a cross longitudinal section of the motor system of FIG. 3.

FIGS. 3 and 4 shows a second embodiment, in which the same numeral references are maintained for identical or similar components. The main difference of this second embodiment is the use of a support disc 70 having a bent edge 70a and a plurality of spoke-shaped projections 72 performing the same function of the punched tongues 36 of first embodiment. The support disc 70 is mechanically fastened to an annular auxiliary support 74 secured to the tub 10 as the cover 2 in the first embodiment. The use of a support disc 70 mechanically fastened to the auxiliary annular support 74 increases the stiffness of the overall motor system.

Moreover, the insert molded metal stiffener 14 includes a peripheral portion that matches a peripheral portion of the annular auxiliary support 74. The support disc 70 may be provided with a plurality of stiffening ribs (not shown), particularly in the areas of the spoke-shaped projections 72. Also in this embodiment the metal stiffener 14 is provided with a plurality of stiffening ribs (not shown). Even if the spoke-shaped projections 72 are shown in the drawings as integral to the support disc 70, such projections 72 could be realized as split elements fastened to the support disc 70 for instance through a dovetail system or the like (not shown).

Figure 5:
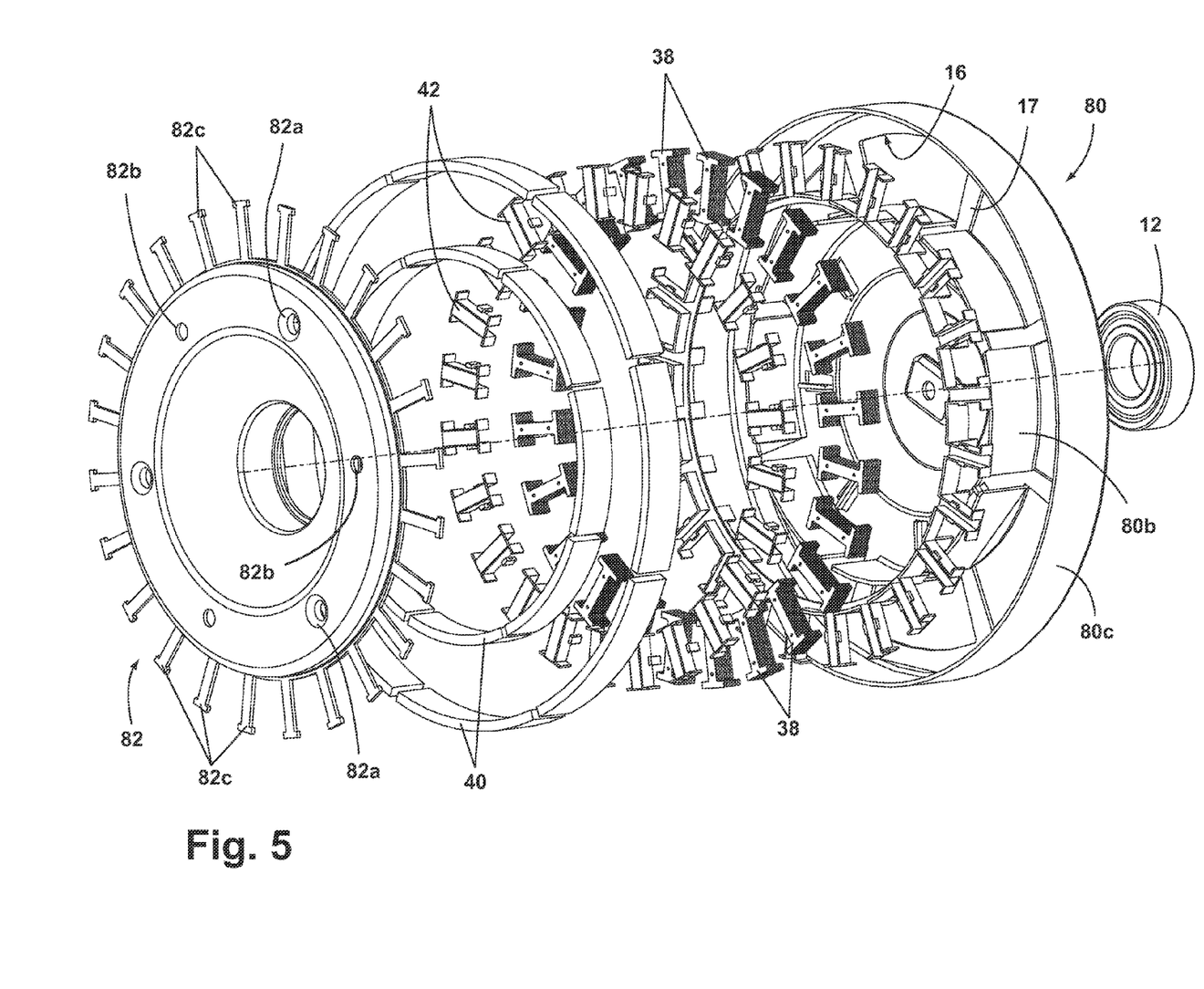
FIG. 5 is an exploded view similar to FIG. 1 and shows a third embodiment.
Figure 6:
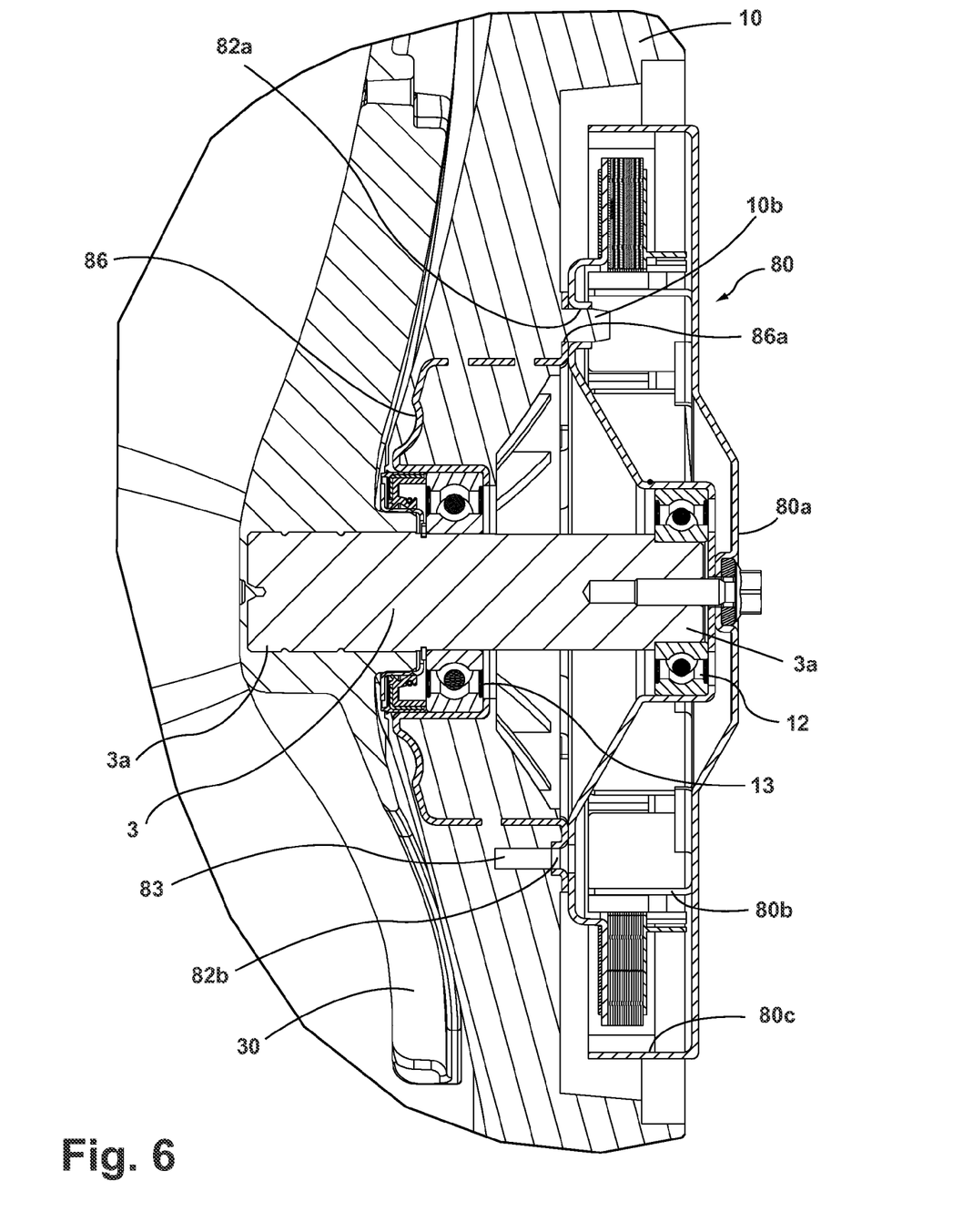
FIG. 6 is a cross longitudinal section of the motor system of FIG. 5.

The embodiment of FIGS. 5 and 6 differs from the previous two embodiments since the rotor assembly 80 is no longer internal in the chamber 34, rather external. In this third embodiment the rotor assembly 80 is keyed on the second end 3b of the shaft 3 (FIG. 6). But apart from the different position of the rotor assembly, the stator has a support disc 82 quite similar to the support disc 70 of FIGS. 3 and 4. The support disc 82 has fastening holes 82a and 82b for protrusions 10b of the tub 10 and for fastening bolts 83 (FIG. 6) respectively. The protrusions and the holes for the bolts 83 match exactly the holes 86a of a disc-shaped metal stiffening part 86 insert molded with the tub 10 and provided with stiffening ribs (not shown). In view of the matching of the holes 82a and 82b of the support disc 82 and the holes 86a of the disc-shaped metal stiffening part 86 the stator can be secured to the tub 10 with a precise concentricity. As in the previous embodiments, the support disc 82 of the stator presents a plurality of finger-shaped portions 82c projecting outward in a radial direction for supporting the cores 38. As in the previous embodiments, the rotor assembly 80 presents a central portion 80a fixed to the second end 3b of the shaft 3, an inner crown 80b and an outer crown 80c for the magnets 40.

Figure 7:
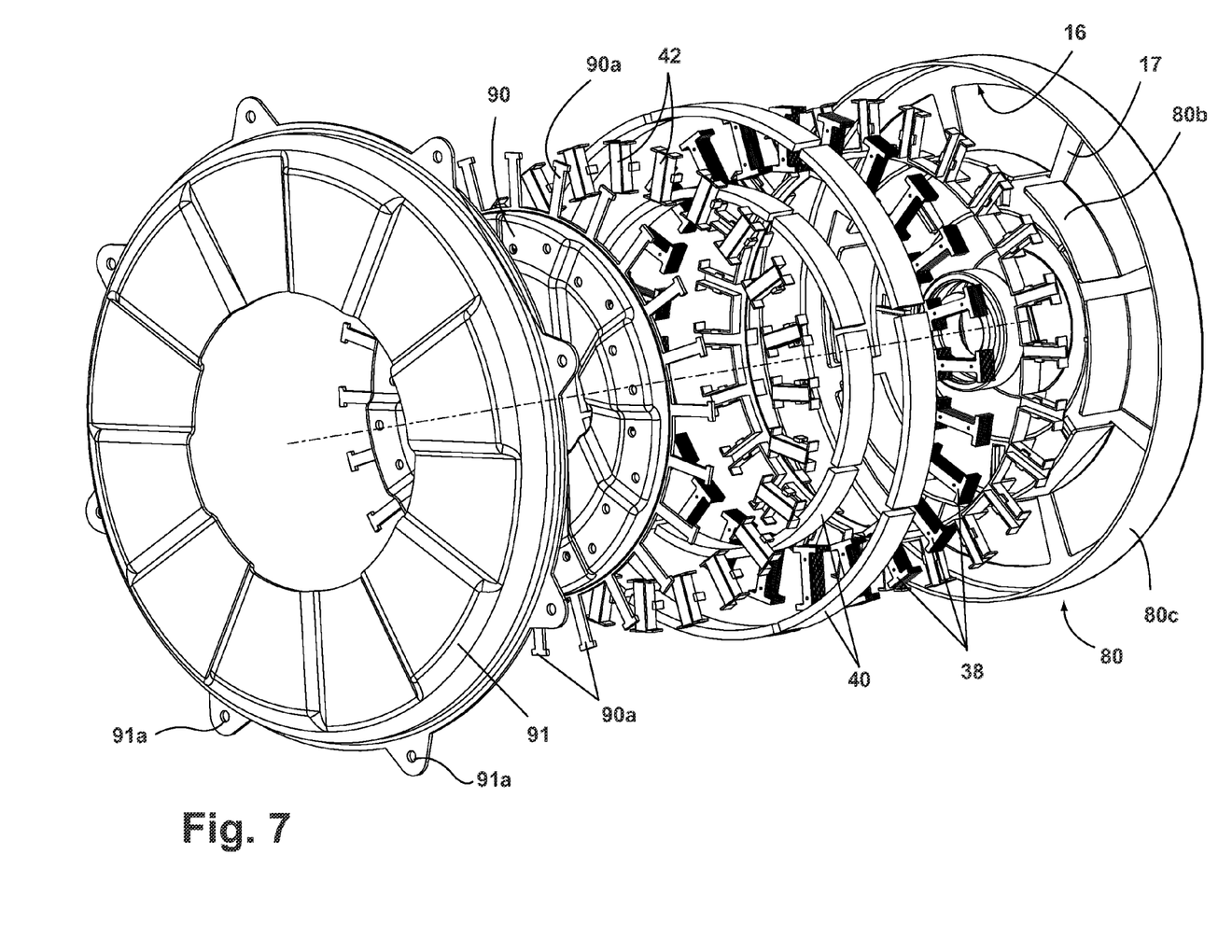
FIG. 7 is an exploded view similar to FIG. 1 and shows a fourth embodiment.
Figure 8:
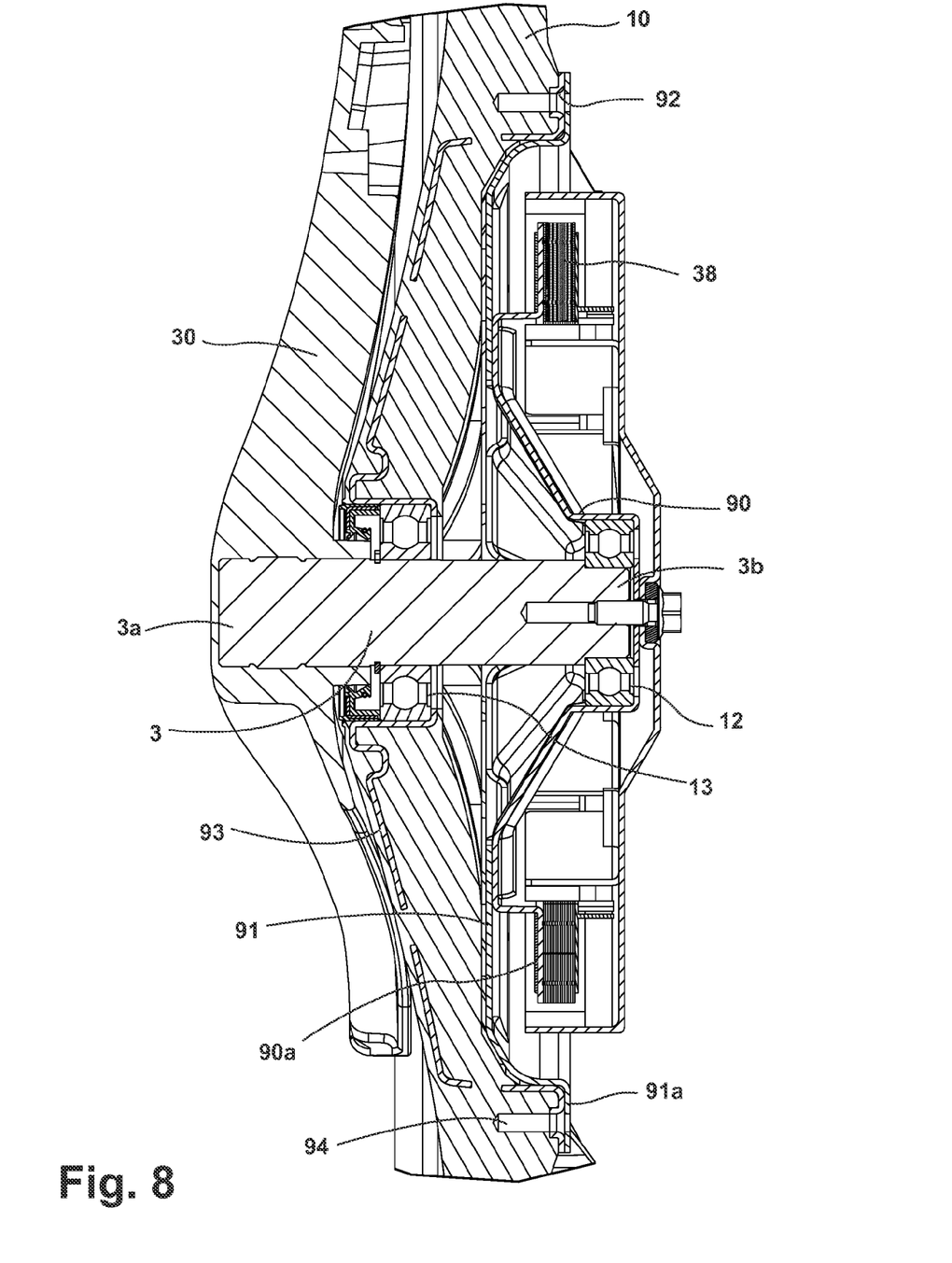
FIG. 8 is a cross longitudinal section of the motor system of FIG. 7.

The fourth embodiment shown in FIGS. 7 and 8 differs from the third embodiment in the way in which the support for the cores 38 is fixed to the tub 10. In such embodiment a support annular element 90 is fastened to a disc-shaped element 91 secured in 91a to the tub 10. As it is shown in FIG. 8, the fastening holes 91a of the disc-shaped element 91 match holes 92 of a stiffening metal element 93 insert molded with the tub 10 and provided with stiffening ribs (not shown). Therefore by securing, through bolts 94, the disc-shaped element 91 to the tub, the stator is secured to the tub 10 with a precise concentricity, since the fastening of the disc-shaped element 91 and of the support annular element 90, carrying a plurality of finger-shaped portions 90a for supporting the cores 38, can be carried out very precisely for instance by spot welding. Moreover the use of a combination of annular element 90 and disc-shaped element 91 fastened together increases the stiffness of the tub 10 in the zone where it is stressed more by the forces transmitted by the drum to the support bearings.

It is clear from the above description of the preferred embodiments it is possible to build the stator using basic building blocks that can be combined to create the stator structure. The split hub construction also includes two bearing holders, one being part of the stator supporting structure and the other being part of the tub and extending inside the tub. This structural part in combination with the stator support structure fixed on the washing unit creates a box structure. If necessary, to facilitate the assembly process of the direct drive motor system, the two separated bearing holder could be designed to be inserted one into the other.

The use of a disc-shaped element supporting a plurality of finger-shaped portions permits adjustment of the number of poles of the stator and only some of the finger-shaped portions may include magnetic cores and windings. It that way, motors of different power may be produced. Moreover, in the embodiment in which the finger-shaped portions are fastened to the disc-shaped element, it is possible to mount such portions at different pitch so as to customize the motor in terms of power and torque.

Even if the description of the above preferred embodiments is focused on a radial core type rotor direct drive system, the technical solution according to the invention can be used as well for axial type motors. It will be sufficient to use finger-shaped portions or spoke-shaped projections of the stator projecting in an axial direction instead of a radial one. In this case magnets would be installed on the surface of a flat disc which would form the rotor. It will also be appreciated that an insert molding process can be used for creating a more rigid stator.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

We claim:

1. A washing machine with a direct drive motor system comprising:
   a tub,
   a drum rotatably mounted inside the tub, the drum defining a longitudinal axis,
   a shaft connected to the drum, and
   a direct drive motor comprising a rotor assembly fastened to the shaft and including magnets positioned in a circumferential direction, and a stator assembly comprising:
   (i) a plurality of magnetic cores of stacked laminations,
   (ii) a plurality of insulators, at least one of the plurality of insulators surrounding each of the plurality of magnetic cores,
   (iii) a number of coils wound on an outer surface of each of the plurality of insulators, and
   (iv) a disc-shaped element including a plurality of elongated plates extending outwardly in a radial direction away from the longitudinal axis, at least one of the elongated plates having one of the plurality of magnetic cores secured thereto,
   wherein each of the elongated plates has (i) a first dimension defined along the longitudinal axis of the drum and (ii) a second dimension defined in a radial direction that is greater than the first dimension.

2. The washing machine of claim 1, wherein the disc-shaped element of the stator assembly is secured to a wall of the tub, the disc-shaped element being interposed between the tub and the rotor assembly.

3. The washing machine of claim 2, wherein the wall of the tub includes a stiffening metal insert having a shape that matches the disc-shaped element.

4. The washing machine of claim 1, wherein the rotor assembly includes a cup-shaped element having an annular external crown portion and an annular internal crown portion.

5. A washing machine with a direct drive motor system comprising:
   a tub,
   a drum rotatably mounted inside the tub, the drum defining a longitudinal axis,
   a shaft connected to the drum, and
   a direct drive motor comprising a rotor assembly fastened to the shaft and including magnets positioned in a circumferential direction, and a stator assembly comprising:
   a plurality of magnetic cores of stacked laminations,
   a plurality of insulators, at least one of the plurality of insulators surrounding each of the plurality of magnetic cores,
   a number of coils wound on an outer surface of each of the plurality of insulators,
   a disc-shaped plate positioned radially inward from the plurality of magnetic cores, the disc-shaped plate having a plurality of mounting holes defined therein, and
   a plurality of elongated plates extending outwardly from the disc-shaped plate in a radial direction away from the longitudinal axis, each elongated plate having (i) one of the plurality of magnetic cores secured thereto, (ii) a first dimension defined along the longitudinal axis of the drum, and (iii) a second dimension defined in a radial direction that is greater than the first dimension.

6. The washing machine of claim 5, wherein:
   each elongated plate includes a surface extending in a radial direction, the surface having a length equal to the second dimension of the elongated plate, and
   each elongated plate has the one of the plurality of magnetic cores secured to the surface.

\* \* \* \* \*